(12) United States Patent
Mortensen (10) Patent No.: US 11,649,164 B2
(45) Date of Patent: May 16, 2023

(54) PLANT AND PROCESS FOR PRODUCING SYNTHESIS GAS

(71) Applicant: HALDOR TOPSØE A/S, Kgs. Lyngby (DK)

(72) Inventor: Peter Mølgaard Mortensen, Roskilde (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 258 days.

(21) Appl. No.: 16/765,356

(22) PCT Filed: Nov. 15, 2018

(86) PCT No.: PCT/EP2018/081409
§ 371 (c)(1),
(2) Date: May 19, 2020

(87) PCT Pub. No.: WO2019/110268
PCT Pub. Date: Jun. 13, 2019

(65) Prior Publication Data
US 2020/0354216 A1    Nov. 12, 2020

(30) Foreign Application Priority Data

Dec. 8, 2017 (DK) .......................... PA 2017-00700

(51) Int. Cl.
*C01B 3/38* (2006.01)

(52) U.S. Cl.
CPC .............. *C01B 3/382* (2013.01); *C01B 3/384* (2013.01); *C01B 3/388* (2013.01);
(Continued)

(58) Field of Classification Search
CPC ......... C01B 3/382; C01B 3/384; C01B 3/388; C01B 2203/0233; C01B 2203/0283;
(Continued)

(56) References Cited

U.S. PATENT DOCUMENTS

| 4,985,230 A | 1/1991 | Baden et al. |
| 5,102,645 A | 4/1992 | Fisher et al. |

(Continued)

FOREIGN PATENT DOCUMENTS

| AU | 2007242933 A1 | 1/2008 |
| CA | 2396402 A1 | 1/2004 |

(Continued)

OTHER PUBLICATIONS

Danish Search Report, in application No. PA2017 00700, dated Jun. 8, 2018 (10 pages).

(Continued)

*Primary Examiner* — Steven J Bos
*Assistant Examiner* — Syed T Iqbal
(74) *Attorney, Agent, or Firm* — Buchanan Ingersoll & Rooney P.C.

(57) ABSTRACT

A synthesis gas plant for producing synthesis gas, said synthesis gas plant including an electrically heated reforming reactor system including a first catalyst active for catalyzing steam methane reforming reaction, said electrically heated reforming reactor system being arranged to receive a feed gas comprising hydrocarbons and outletting a first synthesis gas stream. The synthesis gas plant also includes a post converter downstream the electrically heated reforming reactor system, said post converter housing a second catalyst active for catalyzing steam methane reforming/methanation reactions and reverse water gas shift reaction, said post converter being arranged to receive at least part of said first synthesis gas stream and outletting a second synthesis gas stream. Furthermore, the synthesis gas plant includes means for adding a heated $CO_2$ rich gas stream to the at least part of the first synthesis gas stream upstream the post converter and/or into the post converter.

29 Claims, 2 Drawing Sheets

(52) U.S. Cl.
CPC ............... *C01B 2203/0233* (2013.01); *C01B 2203/0283* (2013.01); *C01B 2203/042* (2013.01); *C01B 2203/0405* (2013.01); *C01B 2203/046* (2013.01); *C01B 2203/085* (2013.01); *C01B 2203/1023* (2013.01); *C01B 2203/16* (2013.01)

(58) Field of Classification Search
CPC ...... C01B 2203/0405; C01B 2203/042; C01B 2203/046; C01B 2203/085; C01B 2203/1023; C01B 2203/16; C01B 2203/0415; C01B 2203/043; C01B 2203/127; C01B 3/38; C10K 3/026
See application file for complete search history.

(56) References Cited

U.S. PATENT DOCUMENTS

| | | | |
|---|---|---|---|
| 5,536,699 | A | 7/1996 | Ghelfi et al. |
| 5,958,273 | A | 9/1999 | Koch et al. |
| 6,527,980 | B1 | 3/2003 | Roden et al. |
| 9,834,440 | B2 | 12/2017 | Kern et al. |
| 2002/0081253 | A1 | 6/2002 | Abe |
| 2002/0119084 | A1 | 8/2002 | Boneberg et al. |
| 2003/0014974 | A1 | 1/2003 | Rojey et al. |
| 2003/0162846 | A1 | 8/2003 | Wang et al. |
| 2005/0054737 | A1 | 3/2005 | Lee-tuffnell et al. |
| 2012/0025140 | A1 | 2/2012 | Tetzlaff |
| 2013/0334465 | A1 | 12/2013 | Zhao et al. |
| 2013/0345326 | A1* | 12/2013 | Bashir ............... C01B 3/384 252/373 |
| 2015/0129805 | A1 | 5/2015 | Karpenko et al. |
| 2016/0023201 | A1 | 1/2016 | Chaudret et al. |
| 2016/0318824 | A1 | 11/2016 | Steynberg et al. |
| 2017/0106360 | A1 | 4/2017 | Meriam |
| 2020/0317514 | A1 | 10/2020 | Mortensen et al. |
| 2020/0377365 | A1* | 12/2020 | Mortensen ............ B01J 19/245 |
| 2021/0113983 | A1* | 4/2021 | Mortensen ............ C01C 3/0208 |
| 2021/0171344 | A1* | 6/2021 | Mortensen ............ C01B 3/40 |
| 2021/0238035 | A1* | 8/2021 | Mortensen ............ C01B 3/40 |
| 2022/0119255 | A1* | 4/2022 | Mortensen ............ C01B 3/48 |
| 2022/0162067 | A1* | 5/2022 | Mortensen .......... C07C 29/1518 |

FOREIGN PATENT DOCUMENTS

| | | |
|---|---|---|
| CA | 2866987 A1 | 9/2013 |
| CA | 2979782 A1 | 9/2016 |
| EP | 0208929 A1 | 1/1987 |
| EP | 0396650 A1 | 11/1990 |
| EP | 0433223 A1 | 6/1991 |
| EP | 0601956 A2 | 6/1994 |
| GB | 2210286 A | 6/1989 |
| JP | 2015509905 A | 4/2015 |
| JP | 2015521578 A | 7/2015 |
| WO | 9002603 A1 | 3/1990 |
| WO | 03070629 A1 | 8/2003 |
| WO | 2013135667 A1 | 9/2013 |
| WO | 2013135699 A1 | 9/2013 |
| WO | 2013190500 A2 | 12/2013 |
| WO | 2014180888 A1 | 11/2014 |
| WO | 2015011503 A1 | 1/2015 |
| WO | 2015103592 A1 | 7/2015 |
| WO | 2015153610 A1 | 10/2015 |
| WO | 2017186608 A1 | 11/2017 |
| WO | 2017211885 A1 | 12/2017 |

OTHER PUBLICATIONS

International Search Report (PCT/ISA/210) dated Jan. 3, 2019, by the European Patent Office as the International Searching Authority for International Application No. PCT/EP2018/081409.
Written Opinion (PCT/ISA/237) dated Jan. 3, 2019, by the European Patent Office as the International Searching Authority for International Application No. PCT/EP2018/081409.
Mortensen et al., "Industrial scale experience on steam reforming of CO2-rich gas", Applied Catalysis A: General 495 (2015) pp. 141-151.
U.S. Appl. No. 16/753,427, Peter Mølgaard Mortensen, filed Apr. 3, 2020.
U.S. Appl. No. 16/766,415, Peter Mølgaard Mortensen, filed May 22, 2020.
Aasberg-Petersen , et al., "Chapter 4—Synthesis gas production for FT synthesis", Studies in Surface Science and Catalysis, vol. 152, 2004, pp. 258-405.
Communication pursuant to Article 94(3) EPC dated Jun. 28, 2022, issued in the corresponding European Patent Application No. 18803667. 7, 4 pages.
Danish Search Report dated May 15, 2018, issued in the corresponding Danish Patent Application No. PA 2017 00697, 8 pages.
Danish Search Report dated Jun. 8, 2018, Issued in the corresponding Danish Patent Application No. PA 2017 00699, 11 pages.
International Search Report (PCT/ISA/210) received for the PCT Application No. PCT/EP2018/081404, dated Jan. 3, 2019, 6 pages.
Written Opinion (PCT/ISA/237) received for the PCT Application No. PCT/EP2018/081404, dated Jan. 3, 2019, 8 pages.
International Search Report and Written Opinion received for the PCT Application No. PCT/EP2018/081407, dated Jan. 3, 2019, 15 pages.
Notice of Reasons for Refusal dated Jun. 29, 2022, issued in the corresponding Japanese Patent Application No. 2020-530989, 8 pages including 4 pages of English Translation.
Mortensen, et al., "Direct Hysteresis Heating of Catalytically Active Ni—Co Nanoparticles as Steam Reforming Catalyst", Industrial & Engineering Chemistry Research, vol. 56, No. 47, Nov. 2, 2017, 2 pages.

* cited by examiner

PLANT AND PROCESS FOR PRODUCING SYNTHESIS GAS

FIELD OF THE INVENTION

Embodiments of the invention generally relate to process and a plant for reforming of a hydrocarbon feed stream comprising a hydrocarbon gas and steam. In particular, the invention relates to a reforming process and plant aimed at producing a reformed stream with a relatively low $H_2/CO$ ratio.

BACKGROUND

Catalytic synthesis gas production by steam reforming a feed gas comprising hydrocarbons has been known for decades. The endothermic steam reforming reaction is typically carried out in a steam reformer (SMR) also denoted a steam methane reformer. A steam reformer has a number of catalyst filled tubes placed in a furnace. The tubes are normally 10-14 meters in length and 7-15 cm in inner diameter. The heat for the endothermic reaction is supplied by combustion of fuels in burners in the furnace. The synthesis gas exit temperature from the steam reformer depends on the application of the synthesis gas but will normally be in the range from 650° C.-980° C.

It is also known that carbon formation on the catalyst used in catalytic synthesis gas production by steam reforming is a challenge, especially for production of synthesis gasses with a relatively low $H_2/CO$ ratio. Therefore, catalysts resistant to carbon formation are required for such synthesis gasses. Such carbon resistant catalysts are e.g. noble metal catalysts, partly passivated nickel catalysts and promoted nickel catalysts. Moreover, industrial scale reforming of $CO_2$ rich gas typically requires a co-feed of water to decrease the severity of the gas for carbon formation. From a thermodynamic viewpoint, it is advantageous to have a high concentration of $CO_2$ and a low concentration of steam in the feed stream to promote the production of synthesis gas with a low $H_2/CO$-ratio. However, operation at such conditions may not be feasible due to the possibility of carbon formation on the catalyst.

Alternative production of a synthesis gas with a low $H_2/CO$ ratio by steam reforming is a sulfur passivated reforming (SPARG) process which may be used for producing synthesis gas with a relatively low $H_2/CO$ ratio. This process requires desulfurization of the produced synthesis gas to produce a sulphur free synthesis gas.

More details of various processes for producing synthesis gas with low $H_2/CO$ ratio can be found in "Industrial scale experience on steam reforming of $CO_2$-rich gas", P. M. Mortensen & I. Dybkjær, Applied Catalysis A: General, 495 (2015), 141-151.

SUMMARY OF THE INVENTION

In the following, reference is made to embodiments of the invention. However, it should be understood that the invention is not limited to specific described embodiments. Instead, any combination of the following features and elements, whether related to different embodiments or not, is contemplated to implement and practice the invention.

An aspect of the invention relates to synthesis gas plant for producing a synthesis gas. The synthesis gas plant comprises a reforming reactor system comprising a first catalyst bed. The first catalyst bed comprises an electrically conductive material and a catalytically active material, where the catalytically active material is arranged for catalyzing steam reforming of a feed gas comprising hydrocarbons to produce a first synthesis gas stream. The reforming reactor system further comprises a pressure shell housing the first catalyst bed, a heat insulation layer between the first catalyst bed and the pressure shell, and at least two conductors electrically connected to the electrically conductive material and to an electrical power supply placed outside the pressure shell. The electrical power supply is dimensioned to heat at least part of the first catalyst bed to a temperature of at least 500° C. by passing an electrical current through the electrically conductive material. The pressure shell has a design pressure of between 15 and 200 bar. The synthesis gas plant further comprises a post converter downstream the reforming reactor system, where the post converter houses a second catalyst active for catalyzing steam methane reforming, methanation and reverse water gas shift reactions. The post converter is arranged to receive at least part of said first synthesis gas stream and outletting a second synthesis gas stream. Furthermore, the reforming reactor system comprises means for adding a heated $CO_2$ rich gas stream to the at least part of the first synthesis gas stream upstream the post convertor and/or into the post convertor.

The plant of the invention provides for a compact plant due to the electrically heated reforming reactor unit. Moreover, the combination of an electrically heated reforming reactor unit and a downstream post converter renders it possible to produce a CO rich synthesis gas stream, viz. the second synthesis gas stream.

The second synthesis gas stream is the product synthesis gas and it is a CO rich synthesis gas. The plant also comprises an outlet from the post converter. The first synthesis gas stream outlet from the electrically heated reforming reactor system comprises hydrogen, steam, carbon monoxide, carbon dioxide and possibly small amounts of other gases, such as methane; the second synthesis gas stream, viz. the product synthesis gas stream from the plant of the invention, comprises hydrogen, carbon monoxide, carbon dioxide, steam and methane.

Preferably, the electrically heated electrically conductive material is the only heat source within the reforming reactor system apart from the temperature of the gasses.

If a $CO_2$-stream with the same composition and amount as the heated $CO_2$ rich gas stream was added to the electrically heated reforming reactor system along with the feed gas comprising hydrocarbons, this would result in an increased risk of carbon formation on the catalyst in the electrically heated reforming reactor system. Hence, by adding the heated $CO_2$ rich gas stream to the at least part of the first synthesis gas stream and/or to the post converter, this avoids the risk of carbon formation on the catalyst in the electrically heated reforming reactor system, while at the same time allowing the production of a CO rich synthesis gas.

The heated $CO_2$ rich gas stream is added to at least part of the first synthesis gas stream or mixed with at least part of the first synthesis gas stream within the post converter, subsequent to at least partly reforming of the hydrocarbon gas in the feed gas comprising hydrocarbons in the reforming reactor system. The combination of an electrically heated reforming reactor system and a post converter, with the addition of heated $CO_2$ rich gas stream between the reforming reactor system and the post converter or directly into the post converter, allows the H/C ratio and the O/C ratios of the gas within the post converter to differ from the H/C and O/C ratios of the gas within the electrically heated reforming reactor system. Thereby, it becomes possible to circumvent conditions where carbon formation on the catalyst within the electrically heated reforming reactor system is probable and at the same time provide a CO rich synthesis gas stream.

Within this context, the term "CO rich synthesis gas" is meant to denote a synthesis gas with a low $H_2/CO$ ratio, such as a synthesis gas with a $H_2/CO$ ratio below 2.5, preferably a synthesis gas with a $H_2/CO$ ratio below 2.0, more preferably a synthesis gas with an $H_2/CO$ ratio below 1.8, more preferably a synthesis gas with an $H_2/CO$ ratio below 1.6, more preferably a synthesis gas with an $H_2/CO$ ratio below 1.4, even more preferably a synthesis gas with an $H_2/CO$ ratio below 1.2 and most preferably a synthesis gas with an $H_2/CO$ ratio below 1.

Within this context the term S/C is an abbreviation for the steam-to-carbon ratio. The steam-to-carbon ratio is the ratio of moles of steam to moles of carbon in hydrocarbons in a gas. Thus, S/C is the total number of moles of steam divided by the total number of moles of carbon from the hydrocarbons in the gas. The term O/C is an abbreviation for the atomic oxygen-to-carbon ratio. The oxygen-to-carbon ratio is the ratio of moles of oxygen to moles of carbon in a gas. The term H/C is an abbreviation for the atomic hydrogen-to-carbon ratio. The hydrogen-to-carbon ratio is the ratio of moles hydrogen to moles of carbon in a gas. It should be noted that the term "C" in the ratio S/C thus is different from the "C" in the ratios H/C and O/C, since in S/C "C" is from hydrocarbons only, whilst in O/C and H/C, "C" denotes all the carbon in the gas.

Preferably, the heated $CO_2$ rich gas stream has a temperature of between about 500° C. and 1100° C. prior to combination with the at least part of the first synthesis gas stream and/or prior to being inlet into the post converter. Preferably, the temperature of the heated $CO_2$ rich gas stream is above 600° C., and more preferably the temperature of the heated $CO_2$ rich gas stream is about 700° C. or above, in order to avoid too low temperatures in the post converter and consequently coking of the second catalyst.

Since the $CO_2$ rich gas stream is heated prior to introduction thereof into the at least part of the first synthesis gas stream or the post converter, the risk of carbon formation can be circumvented and a synthesis gas can be produced at more critical conditions than at typical steam methane reforming. For example, the heated $CO_2$ rich gas stream is heated to about 800° C. prior to being added into the at least part of the first synthesis gas stream or the post converter.

Within this context the term "a $CO_2$ rich gas stream" is meant to denote a gas comprising at least 50 dry mole % $CO_2$, such as at least 70 dry mole % $CO_2$, such as at least 90 dry mole % $CO_2$.

Moreover, the term "reforming" is meant to denote a reforming reaction according to one or more of the following reactions:

(i)

(ii)

(iii)

For higher hydrocarbons, viz. $C_nH_m$, where n≥2, m≥4, equation (i) is generalized as:

(iv), where n≤2, m≤4

Typically, reforming is accompanied by the water gas shift reaction (v):

(v)

The term "steam methane reforming" is meant to cover the reactions (i) and (ii), reaction (iii) is the dry methane reforming reaction, whilst the term "methanation" is meant to cover the reverse reaction of reaction (i). Thus, the term "steam methane reforming/methanation reactions" is meant to denote the reactions (i) and (ii) running towards equilibrium. The term "reverse water gas shift" is meant to denote the reverse reaction of reaction (v). In most cases, all of these reactions are at or close to equilibrium at the outlet from the catalyst bed or catalyst zone of the reactor concerned.

The term "feed gas comprising hydrocarbons" is meant to denote a feed gas comprising a hydrocarbon gas with one or more hydrocarbons, and possibly other constituents, such as $CO_2$ and/or steam. Examples of "a hydrocarbon gas" may be natural gas, town gas, or a mixture of methane and higher hydrocarbons. Typically, the feed gas comprising hydrocarbons comprises a hydrocarbon gas stream having minor amounts of hydrogen, carbon monoxide, carbon dioxide, nitrogen, or argon, or combinations thereof, in addition to steam and possibly carbon dioxide added to the hydrocarbon gas.

Typically, the feed gas comprising hydrocarbons will have undergone desulfurization to remove sulfur therein and thereby avoid deactivation of the catalysts in the process.

In an embodiment, the first catalyst bed comprises a structured catalyst comprising a macroscopic structure of electrically conductive material. The macroscopic structure supports a ceramic coating, and the ceramic coating supports a catalytically active material. Preferably, the macroscopic structure and the ceramic coating have been sintered in an oxidizing atmosphere in order to form chemical bonds between the ceramic coating and the macroscopic structure, where the ceramic coating supports catalytically active particles.

When the catalyst material within the synthesis gas plant comprises a macroscopic structure comprising catalytically active particles, the catalytically active particles are heated from the heating of the macroscopic structure upon subjecting the macroscopic structure to resistance heating by electrical current flowing through the macroscopic structure. The catalytically active particles may thus be any appropriate active phase and any appropriate element.

The close contact between the catalytically active particles and the macroscopic structure enables efficient heating of the catalytically active phase from solid material conduction from the resistance heated macroscopic structure. An important feature of the resistance heating process is thus that the heat is generated inside the object itself, instead of by an external heat source via heat conduction. Thus, the catalyst material can be heated very rapidly to high temperatures.

In an embodiment, the macroscopic structure has been manufactured by extrusion and optionally by subsequent sintering. This/these process(es) give(s) a uniformly shaped macroscopic structure, which can afterwards be coated with the ceramic oxide and impregnated with catalytically active particles. The ceramic coating is coated onto those parts of the macroscopic structure which are meant to be in contact with gas while the reactor unit housing the catalyst material is in use. For example, the sintering may take place in vacuum or in a $H_2$ comprising atmosphere.

As used herein, the term "macroscopic structure" is meant to denote a macroscopic structure material in any appropriate form providing a high geometrical surface area.

The material of the macroscopic structure may be porous or the macroscopic structure may be a solid. The word "macroscopic" in "macroscopic structure" is meant to specify that the structure is large enough to be visible with the naked eye, without magnifying devices.

Non-limiting examples of macroscopic structure are e.g. monoliths. Two types of macroscopic structure are particularly suitable for the inventive process: the straight-channeled elements and the cross-corrugated elements. Various geometries of these elements are conceivable.

The dimensions of the macroscopic structure are typically in the range of cm or even meters. Typically, the length of a macroscopic structure is of the order of cm, such as 0.5 cm, 1 cm, 5 cm, 10 cm or even 50 cm or 100 cm. Dimensions of the macroscopic structure are advantageously made to correspond at least partly to the inner dimensions of a reactor unit housing the catalyst material. Two or more macroscopic structures may be connected in order to provide a monolith having at least one of the outer dimensions in the range of meters, such as a length of 5 m. Conceivable macroscopic structures could take up a reactor unit volume of 1 to 10 m$^3$ or even larger.

The macroscopic structure comprises an electrically conductive material and is designed in order to allow an electrical current to run through the macroscopic structure. Thus, advantageously most of, or all of, the material of the macroscopic is electrically conductive. A material with an appropriate conductivity should be chosen so that an electrical current may run through the macroscopic structure whilst heating up the macroscopic structure. The material of the macroscopic structure is for example a metallic material. Moreover, the macroscopic structure advantageously is a coherent or consistently interconnected material in order to achieve electrical conductivity throughout the catalyst material.

In an embodiment, the first catalyst bed comprises an array of macroscopic structures. When the structured catalyst comprises a number of or an array of macroscopic structures, the individual macroscopic structures within the array may be placed side by side, on top of each other or in a combination thereof. It is stressed, that when the structured catalyst comprises more than one macroscopic structures, the dimensions of the structured catalyst are the dimensions of the more than one macroscopic structures. Thus, as an example, if the overall structured catalyst comprises two macroscopic structures, each having the height h, put on top of each other, the height of the structured catalyst is 2 h. As used herein the term "reforming reactor system comprising a structured catalyst" is not meant to be limited to a reforming reactor system with a single macroscopic structure. Instead, the term is meant to cover both a structured catalyst with a macroscopic structure, ceramic coating and catalytically active material as well as an array of such macroscopic structures.

In an embodiment of the synthesis gas plant the macroscopic structure(s) of said structured catalyst(s) has/have a plurality of parallel channels, a plurality of non-parallel channels and/or a plurality of labyrinthic channels. The channels have walls defining the channels. Several different forms and shapes of the macroscopic structure can be used as long as the surface area of the structured catalyst exposed to the gas is as large as possible. In a preferred embodiment, the macroscopic structure has parallel channels, since such parallel channels render a structured catalyst with a very small pressure drop. In a preferred embodiment, parallel longitudinal channels are skewed in the longitudinal direction of the macroscopic structure. In this way molecules of the gas flowing through the macroscopic structure will mostly tend to hit a wall inside the channels instead of just flowing straight through a channel without necessarily getting into contact with a wall. The dimension of the channels should be appropriate in order to provide a macroscopic structure with a sufficient resistivity. For example, the channels could be quadratic (as seen in cross section perpendicular to the channels) and have a side length of the squares of between 1 and 3 mm; however, channels having a maximum extent in the cross section of up to about 4 cm are conceivable. The walls may e.g. have a thickness of between 0.2 and 2 mm, such as about 0.5 mm, and the ceramic coating supported by the walls has a thickness of between 10 μm and 500 μm, such as between 50 μm and 200 μm, such as 100 μm. In another embodiment the macroscopic structure of the structured catalyst is cross-corrugated.

In an embodiment, macroscopic structure(s) is/are extruded and sintered structure(s). Preferably, the extruded macroscopic structure is extruded coherently or cohesively in order to provide it with uniform geometric properties. This provides for a uniform distribution of current and thereby heat therein. When the macroscopic structure is extruded, the pressure drop from the inlet to the outlet of the reactor may be reduced considerably compared to when the catalyst material is in the form of pellets. Throughout this text, the term "coherent" is meant to be synonymous to cohesive and thus mean a material that is consistently intra-connected or consistently coupled.

By having a coherent extruded macroscopic structure with uniform geometric properties, it is possible to obtain uniform distribution of current in the macroscopic structure. In combination with having the macroscopic structure and the ceramic coating sintered in an oxidizing atmosphere in order to form chemical bonds between the ceramic coating and the macroscopic structure an especially high heat conduction between the electrically heated macroscopic structure and the catalytically active particles supported by the ceramic coating is possible, offering close and nearly direct contact between the heat source and the active site. Thereby, the catalyst material is compact in terms of gas processing per reactor volume, and a reactor housing the catalyst material may be compact. At the same time this offers immediate response to the heating of the process, making fast start-up possible. When the macroscopic structure is extruded, the pressure drop from the inlet to the outlet of the reactor may be reduced considerably compared to when the catalyst material is in the form of pellets.

In an embodiment, the resistivity of the electrically conductive material is between $10^{-5}$ Ω·m and $10^{-7}$ Ω·m. A material with a resistivity within this range provides for an efficient heating of the structured catalyst when energized with a power source. Graphite has a resistivity of about $10^{-6}$ Ω·m at 20° C., kanthal has a resistivity of about $10^{-6}$ Ω·m at 20° C., whilst stainless steel has a resistivity of about $10^{-7}$ Ω·m at 20° C. Kanthal is the trademark for a family of iron-chromium-aluminum (FeCrAl) alloys. The macroscopic structure may for example be made of FeCrAlloy having a resistivity of ca. $1.5 \cdot 10^{-6}$ Ω·m at 20° C.

In an embodiment, the material of the macroscopic structure is chosen as a material arranged to generate a heat flux of 500 to 50000 W/m$^2$ by resistance heating of the material. Preferably, resistance heating of the material supplies a heat flux of between 5 kW/m$^2$ and 12 kW/m$^2$, for example between 8 kW/m$^2$ and 10 kW/m$^2$. The heat flux is given as heat per geometric surface area of the surface exposed to the gas. In an embodiment, the geometric surface area of the macroscopic structure is between 100 and 3000 m$^2$/m$^3$, such as between 500 and 1100 m$^2$/m$^3$. It is understood, that the heat flux is created by the current running through the electrically conductive material. The combination of geometry and the choice of material as well as the current and voltage of the current through the macroscopic structure determines the heat supplied by the macroscopic structure.

In an embodiment, wherein the connection between the macroscopic structure(s) and said at least two conductors is a mechanical connection, a welded connection, a brazed connection or a combination thereof. The structured catalyst may comprise terminals physically and electrically connected to the structured catalyst in order to facilitate the electrical connection between the macroscopic structure of the structured catalyst and the at least two conductors. The term "mechanical connection" is meant to denote a connection where two components are held together mechanically, such as by a threaded connection or by clamping, so that a current may run between the components.

In an embodiment, the pressure shell further comprises one or more inlets close to or in combination with at least one fitting in order to allow a cooling gas to flow over, around, close to, or inside at least one conductor within said pressure shell. If the cooling gas is not used, the conductors may be heated by the feed gas to the reforming reactor system, resistance heating of conductor due to the applied current, and/or heat conduction from the structured catalyst. The cooling gas could e.g. be hydrogen, nitrogen, steam, carbon dioxide or mixtures thereof. The temperature of the cooling gas at entry into the pressure shell may be e.g. about 100° C. or 200° C. or 250° C. In an embodiment, the conductor(s) is (are) hollow so that the cooling gas may flow through the conductor(s) and cool it (them) from within. By keeping the temperature of the fitting low, e.g. at around 100-200° C., it is easier to have a leak tight configuration. In an embodiment, a part of the feed gas, such as carbon dioxide and/or steam, is fed to the pressure shell as the cooling gas. In another embodiment, part of the feed gas or a gas with the same composition as the feed gas is used as cooling gas. It is noticed, that the feed gas could have a high inlet temperature and therefore have a heating effect on at least a part of the conductor, but in this case the feed gas would still force a gas flow away from the fittings and therefore ensure that a hotter gas, as the product gas, does not come in contact with the fitting.

In an embodiment, the electrically conductive material comprises a resistor embedded in the catalytically active material of the first catalyst bed. This embedded resistor can be in any appropriate form of plates, spirals, rods, or similar, where catalyst pellets with the catalytically active material are positioned to surround, or in another way be in close contact to, the embedded resistor. Again, the hydrogen plant of the invention may include any appropriate number of power supplies and any appropriate number of conductors connecting the power supply/supplies and the electrically conductive material, viz. the embedded resistor. The catalyst material may be catalyst pellets, extrudates or granulates comprising a support material and catalytically active material. The catalyst material may comprise an appropriate combination of catalyst support and catalytically active material or catalytically active phase to facilitate the endothermic reaction.

In an embodiment, the embedded resistor supports a ceramic coating, wherein said ceramic coating supports said catalytically active material. Thus, the embedded resistor may, similar to the macroscopic support, be coated with a ceramic coating to directly support a catalytically active phase while still being embedded in the catalyst material. In this embodiment, the catalyst material surrounds the embedded resistor and the first catalyst bed comprises catalyst pellets, extrudates or granulates with catalytically active material.

In an embodiment, the reforming reactor system further comprises a bed of a third catalyst material upstream said first catalyst bed within said pressure shell. Here, the term "upstream" is seen from the flow direction of the feed gas. Thus, the term "upstream" is here meant to denote that the feed gas is directed through the bed of second catalyst material prior to reaching the first catalyst bed. This provides for a situation where the second catalyst material can be arranged for prereforming the feed gas (according to reaction (iv) above), so that the reforming reactor system provides prereforming and steam reforming within one pressure shell. This can also provide a situation where the hydrocarbons in the feed gas react with steam and/or $CO_2$ over the second catalyst material (such as according to reactions (i)-(v) above) and that the process gas to the first catalyst bed then has a lower content of hydrocarbons than the feed gas to the second catalyst material. No specific heating needs to be provided to the bed of second catalyst material; however, the bed of second catalyst material may be heated indirectly if it is in close proximity to the structured catalyst. Alternatively, the second catalyst material may be heated. It is noted, that the second bed of second catalyst material and the first catalyst bed are both housed within the pressure shell.

In an embodiment, the synthesis gas plant further comprises a gas separation system downstream the post converter, where the gas separation system comprises one or more of the following units: flash separation, a $CO_2$ wash unit, a temperature swing adsorption unit, pressure swing adsorption unit, a membrane, a cryogenic separation unit or combinations thereof. Thus, the product synthesis gas undergoes further processing downstream the reforming reactor system. A cold box is defined as a cryogenic process for separation of a mixture of $H_2$, CO, and other gasses into a somewhat pure stream of CO, a somewhat pure stream of $H_2$, and a balancing stream of what remains from the feed stream. Typically, $CO_2$ will at least be separated from the synthesis gas and this may advantageously be led back to the post converter thereby minimizing the overall $CO_2$ consumption of the plant.

By flash separation is meant a phase separation unit, where a stream is divided into a liquid and gas phase close to or at the thermodynamic phase equilibrium at a given temperature.

By $CO_2$ wash is meant a unit utilizing a process, such as chemical absorption, for removing $CO_2$ from the process gas. In chemical absorption, the $CO_2$ containing gas is passed over a solvent which reacts with $CO_2$ and in this way binds it. The majority of the chemical solvents are amines, classified as primary amines as monoethanolamine (MEA) and diglycolamine (DGA), secondary amines as diethanolamine (DEA) and diisopropanolamine (DIPA), or tertiary amines as triethanolamine (TEA) and methyldiethanolamine (MDEA), but also ammonia and liquid alkali carbonates as $K_2CO_3$ and $NaCO_3$ can be used.

By swing adsorption, a unit for adsorbing selected compounds is meant. In this type of equipment, a dynamic equilibrium between adsorption and desorption of gas molecules over an adsorption material is established. The adsorption of the gas molecules can be caused by steric, kinetic, or equilibrium effects. The exact mechanism will be determined by the used adsorbent and the equilibrium saturation will be dependent on temperature and pressure. Typically, the adsorbent material is treated in the mixed gas until near saturation of the heaviest compounds and will subsequently need regeneration. The regeneration can be done by changing pressure or temperature. In practice, this means that a at least two reactor process is used, saturating the adsorbent at high pressure or low temperature initially in one reactor and then switching reactor, now desorbing the adsorbed molecules from the same reactor by decreasing the pressure or increasing the temperature. When the unit operates with changing pressures, it is called a pressure swing adsorption unit, and when the unit operates with changing temperature, it is called a temperature swing adsorption unit. Pressure swing adsorption can generate a hydrogen purity of 99.9% or above.

By membrane is meant separation over an at least partly solid barrier, such as a polymer, where the transport of individual gas species takes place at different rates defined by their permeability. This allows for up-concentration, or dilution, of a component in the retentate of the membrane.

By cryogenic separation is meant a process utilizing the phase change of different species in the gas to separate individual components from a gas mixture by controlling the temperature.

In an embodiment, the synthesis gas plant further comprises a first heating unit for heating the feed gas upstream the reforming reactor system. Thus, the first heating unit is arranged to heat the feed stream prior to inletting the feed gas to the reforming reactor system. The first heating unit is e.g. a fired heater, a heat exchange unit or an electric preheating unit. A heat exchange unit may be any appropriate heat exchanger, such as a solid-fluid heat exchanger or a fluid-fluid heat exchanger, wherein the feed gas comprising hydrocarbons is heated by heat exchange upstream the electrically heated reforming reactor system. Known examples of such heat exchange units are shell and tube heat exchangers or plate heat exchangers.

In an embodiment, the synthesis gas plant further comprises a second heating unit arranged to heating a $CO_2$ rich gas stream to the heated $CO_2$ rich gas stream by heat exchange within the second heating unit. In this embodiment, the plant comprises a separate heating unit for heating the $CO_2$ rich gas stream by heat exchange. Alternatively, the first and the second heating units are one single heating unit. Hereby, the first heating unit used for preheating the feed gas comprising hydrocarbons is also used for heating the $CO_2$ rich gas stream; thereby, no additional unit is necessary for the heating of the $CO_2$ rich gas stream.

In an embodiment, the synthesis gas plant further comprises a heat exchange unit allowing heating a $CO_2$ rich gas stream to a heated $CO_2$ rich gas stream by heat exchange with at least part of the second synthesis gas exiting the reverse water gas and/or by heat exchange with superheated steam upstream post converter. Superheated steam will typically be present as an output gas stream from a waste heat recovery unit downstream the post converter. Typically, further heating of the heated $CO_2$ rich gas stream will be required.

The preheating of the $CO_2$ rich gas stream to a heated $CO_2$ rich gas stream may take place as a combination of the embodiments indicated above. It is particularly advantageous if the last of the units of such a combination is an electrically heated heating unit, since this allows for preheating of the $CO_2$ to a temperature of about 600° C. or above, preferably to a temperature of about 800° C. or above, and most preferably to a temperature of about 1000° C. or above.

In an embodiment, the post converter is an adiabatic post converter.

In an embodiment, the synthesis gas plant further comprising a gas purification unit and/or a prereforming unit upstream the reforming reactor system. The gas purification unit is e.g. a desulfurization unit carrying out a desulfurization step. The prereforming unit is e.g. an adiabatic prereforming. The prereforming unit is arranged to carry out prereforming according to reaction (iv) above, e.g. in a temperature range of ca. 350-550° C., to convert higher hydrocarbons as an initial step in the process normally taking place downstream the desulfurization step. This removes the risk of carbon formation from higher hydrocarbons on catalyst in the downstream units.

In an embodiment, the reforming reactor system of the synthesis gas plant further comprises a control system arranged to control the electrical power supply to ensure that the temperature of the gas exiting the pressure shell of the reforming reactor system lies in a predetermined range and/or to ensure that the conversion of hydrocarbons in the feed gas lies in a predetermined range and/or to ensure the dry mole concentration of methane lies in a predetermined range and/or to ensure the approach to equilibrium of the steam reforming reaction lies in a predetermined range.

In an embodiment, the catalytically active material of the first catalyst bed and/or the second catalyst is a steam reforming catalyst. Examples of steam reforming catalysts are $Ni/MgAl_2O_4$, $Ni/Al_2O_3$, $Ni/CaAl_2O_4$, $Ru/MgAl_2O_4$, $Rh/MgAl_2O_4$, $Ir/MgAl_2O_4$, $Mo_2C$, $Wo_2C$, $CeO_2$, a noble metal on an $Al_2O_3$ carrier, but other catalysts suitable for reforming are also conceivable.

Another aspect of the invention relates to a process for producing synthesis gas. The process comprises the steps of:
a) in a reforming reactor system, comprising a first catalyst active bed comprising an electrically conductive material and a catalytically active material arranged for catalyzing steam reforming of a feed gas comprising hydrocarbons to produce a first synthesis gas stream, where the reforming reactor system further comprises a pressure shell housing the first catalyst bed, a heat insulation layer between the first catalyst bed and the pressure shell, and at least two conductors electrically connected to the electrically conductive material and to an electrical power supply placed outside the pressure shell, wherein the pressure shell has a design pressure of between 15 and 200 bar, receiving a feed gas comprising hydrocarbons, passing an electrical current through the electrically conductive material thereby heating at least part of the first catalyst bed to a temperature of at least 500° C. by, letting the feed gas react over the first catalyst bed and outletting a first synthesis gas stream;
b) in a post converter downstream the reforming reactor system, the post converter housing a second catalyst active for catalyzing steam methane reforming, methanation and reverse water gas shift reactions, receiving at least part of the first synthesis gas stream, carrying out steam methane reforming, methanation and reverse water gas shift reactions and outletting a second synthesis gas stream; and
c) adding a heated $CO_2$ rich gas stream to the at least part of the first synthesis gas stream upstream the post converter and/or into the post converter.

The electrically heated reforming reactor system is specifically advantageous in that the combination with the post convertor gives a synergy effect. This is due to the fact that the electrically heated reforming reactor system allows for a high temperature of the first synthesis gas stream which can be in the range from 800–1200° C., preferably between 950 and 1100° C. This high temperature allows for a high temperature of the mixed gas inlet to the post convertor and consequently also within the post convertor. By having a high temperature in the post convertor, a high yield of CO can be achieved because the endothermic reverse water gas shift reaction is displaced towards CO.

The advantages of the process and embodiments thereof correspond to those described in relation to the synthesis gas plant of the invention. They will therefore not be described in further detail here.

BRIEF DESCRIPTION OF THE DRAWINGS

Embodiments of the present invention are explained, by way of example, and with reference to the accompanying drawings. It is to be noted that the appended drawings illustrate only examples of embodiments of this invention and are therefore not to be considered limiting of its scope, for the invention may admit to other equally effective embodiments.

DETAILED DESCRIPTION

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Figure 1:
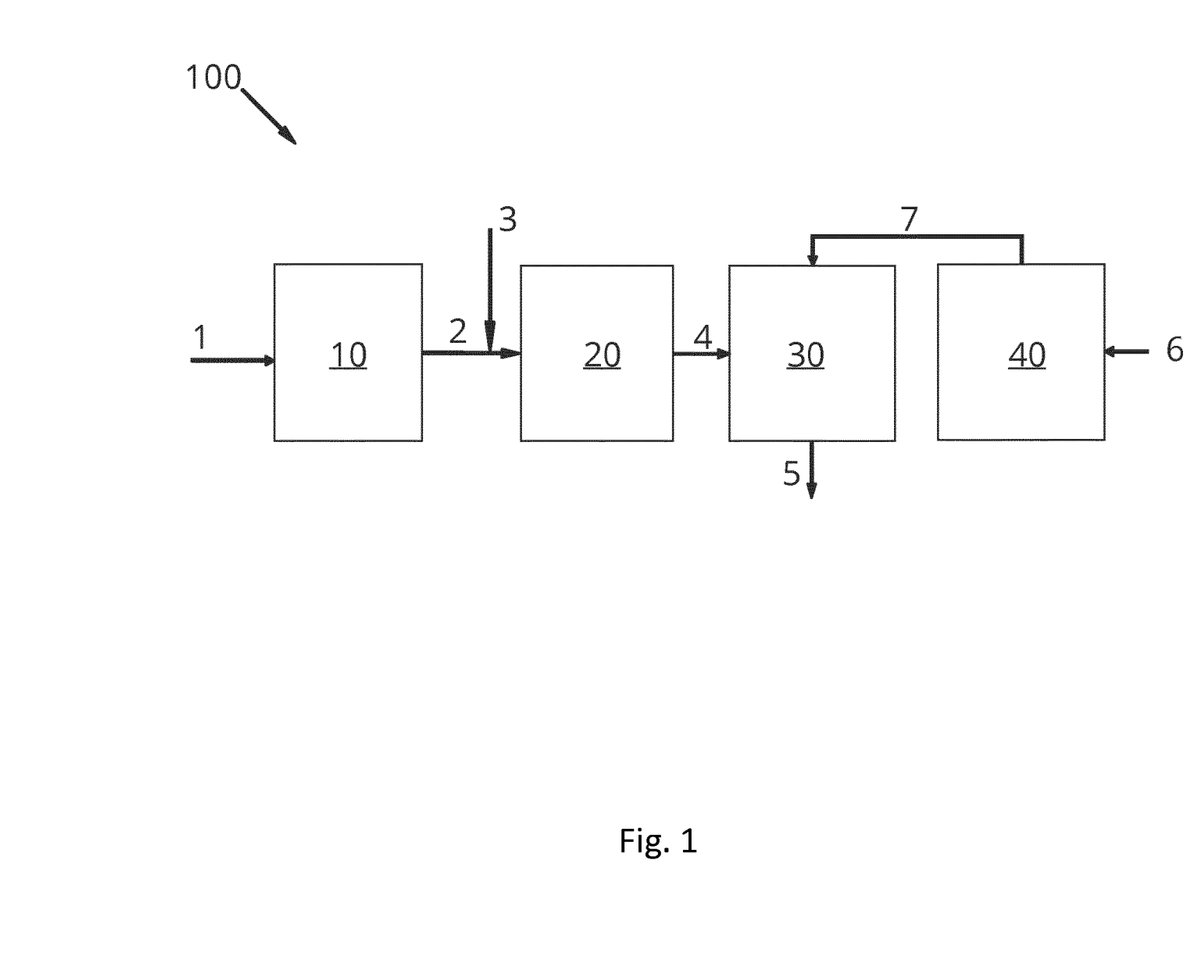
FIGS. 1 and 2 are schematic drawings of systems for producing a synthesis gas according to the invention.

FIG. 1 is a schematic drawing of a synthesis gas plant 100 for producing a synthesis gas according to the invention. The synthesis gas plant 100 comprises an electrically heated reforming reactor system 20 and a post converter 30. The post converter 30 may e.g. be an adiabatic post converter. The synthesis gas plant 100 also comprises an optional first heating unit 10 upstream the electrically heated reforming reactor system 20.

Feed streams to the synthesis gas plant 100 comprises a feed gas comprising hydrocarbons 1, which is optionally heated in the optional first heating unit 10 to a preheated feed gas comprising hydrocarbons 2. In the case where the synthesis gas plant 100 does not comprise the first heating unit 10, the feed gas comprising hydrocarbons 1 is fed directly to the electrically heated reforming reactor system 20. The feed gas comprising hydrocarbons 1 is e.g. a stream of natural gas with steam added in order to facilitate steam methane reforming.

The electrically heated reforming reactor system 20 comprises means for electrically heating the catalyst housed within the electrically heated reforming reactor system 20, such as by resistance heating. The electrically heated reforming reactor system 20 moreover comprises one or more inlets for letting the preheated feed gas comprising hydrocarbons 2 and steam 3 into contact with the first catalyst housed within the electrically heated reforming reactor system 20, and an outlet for outletting a first synthesis gas stream 4 comprising at least partly reformed gas from the electrically heated reforming reactor system 20. The first synthesis gas stream 4 exiting the electrically heated reforming reactor system 20 typically has a temperature of between about 650° C. and about 1050° C., such as about 950° C.

The first synthesis gas streams 4 is led into a post converter 30 comprising a second catalyst active for catalyzing steam methane reforming/methanation and reverse water gas shift reactions. The post converter 30 may be an adiabatic reactor or an electrically heated unit. The post converter 30 comprises an outlet for letting out a second synthesis gas stream 5. A heated $CO_2$ rich gas stream 7 is also led into the post converter 30. The heated $CO_2$ rich gas stream 7 may be combined with the first synthesis gas stream 4 prior to being inlet into the post converter 30, or the heated $CO_2$ rich gas stream 7 and the first synthesis gas stream 4 are input separately into the post converter 30.

Within the post converter 30, the first synthesis gas stream 4 is reacted towards equilibrium by the reverse water gas shift and steam methane reforming/methanation reactions. The second synthesis gas stream 5 is close to equilibrium with respect to the steam methane reforming/methanation reactions and the reverse water gas shift reaction at the outlet of the post converter 30. The steam methane reforming reaction is endothermic, the reverse water gas shift reaction is mildly endothermic, whilst the methanation reaction is exothermic.

Therefore, in the case where the post converter 30 is an adiabatic unit, the temperature of the second synthesis gas stream 5 exiting the post converter 30 may be lower than the temperature of the first synthesis gas stream 4 or it may have the same temperature as the first synthesis gas stream 4. The second synthesis gas stream 5 exiting the post converter 30 may be further processed downstream the third reactor, or the second synthesis gas stream may be the product synthesis gas stream from the synthesis gas plant 100.

The synthesis gas plant 100 moreover comprises a second heating unit 40 for preheating of a $CO_2$ rich gas stream 6 to a heated $CO_2$ rich gas stream 7. The second heating unit 40 may also compress the $CO_2$ rich gas stream 6, so that the resultant $CO_2$ rich gas stream 7 is a heated and compressed $CO_2$ rich gas stream 7.

Optionally, only a part of the first synthesis gas stream 4 is led from the electrically heated reforming reactor system 20 to the post converter 30. In this case, the part of the first synthesis gas stream 4 bypassing the post converter 30 may be combined with the second synthesis gas stream 5 downstream the post converter 30.

Figure 2:
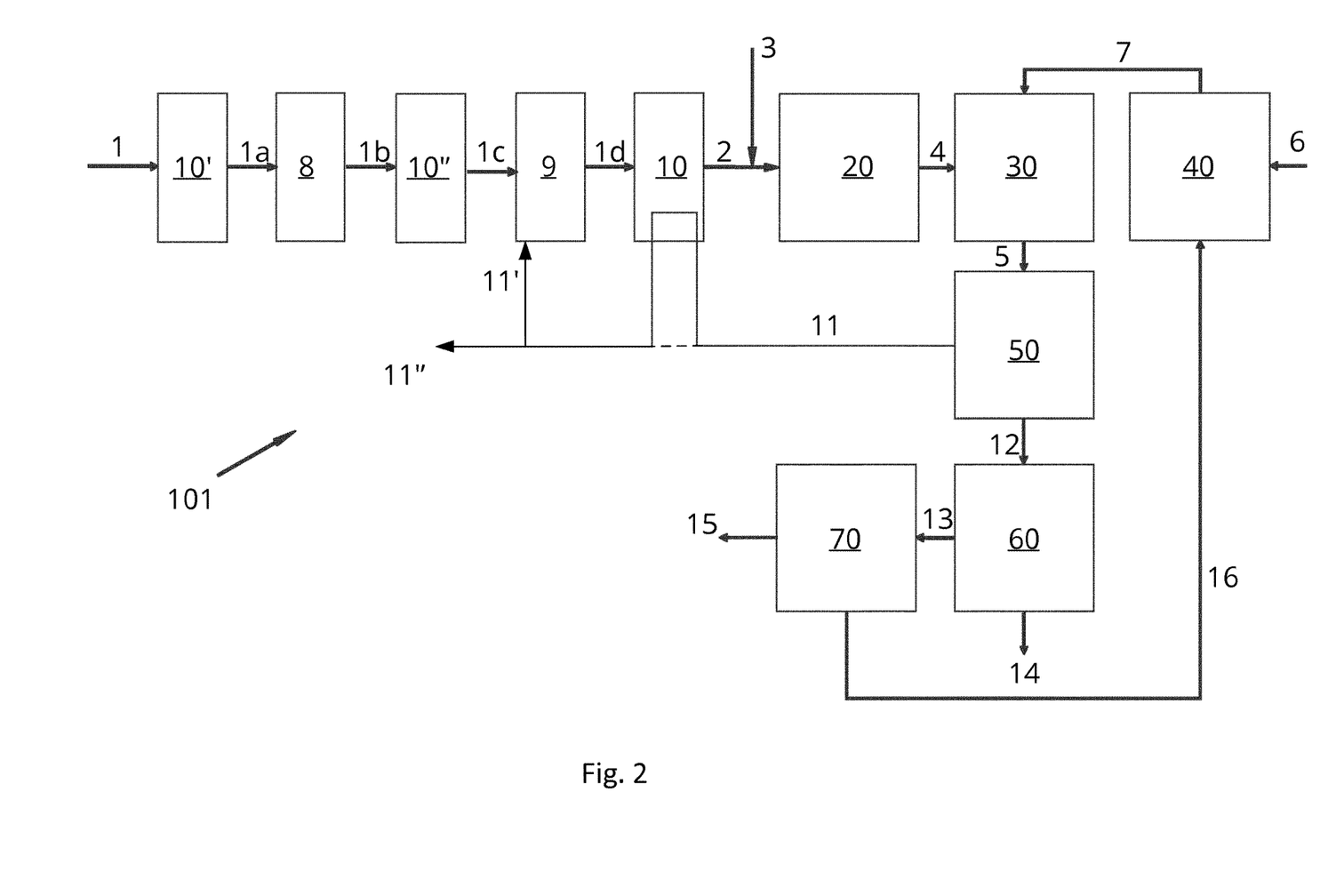

FIG. 2 is a schematic drawing of a synthesis gas plant 101 for producing synthesis gas according to the invention. The synthesis gas plant 101 comprises the units/components of the synthesis gas plant 100 shown in FIG. 1 as well as further units. Similar units are denoted by similar reference numbers and will not be described in detail here. The synthesis gas plant 101 thus also comprises the first and second heating units 10, 40 of the synthesis gas plant 100 as well as a third and fourth heating units 10' and 10", respectively.

Within the synthesis gas plant 101, the third heating unit 10' is arranged to preheat a feed gas comprising hydrocarbons 1 to a preheated feed gas 1a and a desulfurization unit 8 arranged to desulfurize the preheated feed gas 1a to a desulfurized (and preheated) feed gas 1b. The feed gas comprising hydrocarbons 1 is e.g. a stream of natural gas, such as natural gas, town gas, or a mixture of methane and higher hydrocarbons, with steam added to facilitate steam methane reforming. Typically, the feed gas comprising hydrocarbons 1 is a feed gas comprising hydrocarbons and comprising minor amounts of hydrogen, carbon monoxide, carbon dioxide, nitrogen, argon or combinations thereof, in addition to the hydrocarbon gasses therein, and in addition to steam added to facilitate steam methane reforming.

The desulfurized feed gas 1b is heated in the fourth heating unit 10" to provide the desulfurized and heated feed gas 1c which is fed into a prereforming unit 9 arranged to prereform the desulfurized and heated feed gas 1c together with heated steam 11' to a prereformed feed gas 1d. The prereformed feed gas 1d is fed to a further heating unit 10, also denoted "a first heating unit 10", for heating the prereformed feed gas 1d to a preheated and prereformed feed gas 2. The preheated and prereformed feed gas 2 is fed to an electrically heated reforming reactor system 20, optionally together with further steam 3. Within the electrically heated reforming reactor system 20 the preheated and prereformed feed gas 2 and the steam 3 undergo steam methane reforming, thereby producing a first synthesis gas stream 4 which is led to a post converter 30, in the form of an adiabatic post converter. The second synthesis gas stream 5 outlet from the post converter 30 typically has a temperature of about 600-900° C. and it is led to a waste heat recovery section 50 wherein steam is heated by the second synthesis gas stream 5 to heated steam 11, and the cooled second synthesis gas is outlet from the waste heat recovery unit 50 as a cooled second synthesis gas stream 12. The heated steam 11 may be further heated in the first heating unit 10 to form a stream of superheated steam. The stream of superheated steam is split up into a first stream 11' of superheated steam led into the prereforming unit 9 and a second stream 11" of superheated steam which is a byproduct of the process outlet from the synthesis gas plant 101.

A condensation unit 60 is arranged to receive the cooled second synthesis gas stream 12 and condense steam within the second synthesis gas stream to a condensate stream 14. The remaining dried second synthesis gas stream 13 is subsequently fed to a $CO_2$ separation unit 70 in the form of a unit with a membrane, a $CO_2$ wash unit or a $CO_2$ stripper. The $CO_2$ separation unit 70 outputs a $CO_2$ rich stream 16 and a $CO_2$ lean product synthesis gas 15. The $CO_2$ rich stream 16 may be fed to the second heating unit 40 for compression and preheating of $CO_2$. The second heating unit 40 typically receives an additional stream 6 of $CO_2$ rich gas stream in order to provide sufficient heated $CO_2$ rich gas stream 7 to the post converter 30.

Example

An example calculation of the process is given in Table 1 below. A feed gas comprising hydrocarbons comprising a hydrocarbon gas, $CO_2$ and steam, and having a S/C ratio of 1.0 fed to the electrically heated reforming reactor system 20 of the invention as shown in FIG. 1. The feed gas comprising hydrocarbons is heated in the first heating unit 10 to 450° C. prior to being let into the electrically heated reforming reactor system 20. Within the electrically heated reforming reactor system 20 the gas is reformed and exits electrically heated reforming reactor system 20 as the first synthesis gas stream 4 having a temperature of 1000° C.

A $CO_2$ gas is preheated to 260° C. and led into first heating unit 10 in the form of an electric $CO_2$ heating unit 10, where it is further preheated to 1000° C. The $CO_2$ gas preheated to 1000° C. and the first synthesis gas stream 4 at a temperature of 1000° C. are led into the post converter 30 at a temperature of 1000° C. The $CO_2$ gas and the first synthesis gas stream 4 may be combined to a single gas, having a temperature of 1000° C., before being led into the post converter 30.

Within the post converter 30, the $CO_2$ gas and the first synthesis gas stream 4 are equilibrated, viz. undergo reverse water gas shift, methanation and reforming reactions. The exit temperature of the gas stream exiting the post converter 30 is 853° C.

TABLE 1

|  | Electrically heated reforming reactor system 20 | Electric $CO_2$ heating unit 10 | Post converter 30 |
| --- | --- | --- | --- |
| Inlet T [° C.] | 450 | 260 | 1000 |
| Outlet T [° C.] | 1000 | 1000 | 853 |
| Pressure [barg] | 27 | 27 | 26 |
| S/C | 1 | — | — |
| $CH_4$ feed addition [$Nm^3/h$] | 11741 | — | — |
| $H_2O$ feed addition [$Nm^3/h$] | 11973 | — | — |
| $CO_2$ feed addition [$Nm^3/h$] | 0 | 19660 | — |
| $H_2$ out [dry mol %] | 63.5 | — | 28.7 |
| CO out [dry mol %] | 19.8 | — | 29.0 |

Thus, when the synthesis gas plant and process of the invention are used, it is possible to provide a synthesis gas stream having a relative high amount of CO. In the example of Table 1, the $H_2$/CO ratio is 1.0, while the normalized $H_2O/CH_4$ is ca. 1.0 corresponding to H/C and O/C ratios of 2.3 and 1.9, respectively. This would be more difficult in a steam methane reforming reactor without encountering problems with carbon formation on the catalyst and/or leading to very large reactor sizes. This is illustrated by the example in Table 2, where production of a synthesis gas of a $H_2$/CO ratio of 1.0 is produced in a single SMR from the amount of methane as the example in Table 1. For comparison, in an SMR without a post converter, here denoted "a stand-alone SMR", much more $CO_2$ and $H_2O$ is added to the processes, signifying the larger steam methane reforming reactor size. See Table 2.

TABLE 2

|  | Stand-alone SMR |
| --- | --- |
| Inlet T [° C.] | 450 |
| Outlet T [° C.] | 950 |
| Pressure [barg] | 27 |
| S/C | 2.3 |
| $CH_4$ feed addition [$Nm^3/h$] | 11741 |
| $H_2O$ feed addition [$Nm^3/h$] | 27004 |
| $CO_2$ feed addition [$Nm^3/h$] | 29572 |
| $H_2$ out [dry mol %] | 25.1 |
| CO out [dry mol %] | 25.1 |

The invention claimed is:
1. A synthesis gas plant for producing a synthesis gas, said synthesis gas plant comprising:
a reforming reactor system comprising a first catalyst bed comprising an electrically conductive material and a catalytically active material, said catalytically active material being arranged for catalyzing steam reforming of a feed gas comprising hydrocarbons to produce a first synthesis gas stream, said reforming reactor system further comprising a pressure shell housing said first catalyst bed, a heat insulation layer between said first catalyst bed and said pressure shell, and at least two conductors electrically connected to said electrically conductive material and to an electrical power supply placed outside said pressure shell, wherein said electrical power supply is dimensioned to heat at least part of said first catalyst bed to a temperature of at least 500° C. by passing an electrical current through said electrically conductive material, wherein said pressure shell has a design pressure of between 15 and 200 bar, a post converter downstream said reforming reactor system, said post converter housing a second catalyst active for catalyzing steam methane reforming, methanation and reverse water gas shift reactions, said post converter being arranged to receive at least part of said first synthesis gas stream and outletting a second synthesis gas stream; and means for adding a heated $CO_2$ rich gas stream to the at least part of the first synthesis gas stream upstream said post convertor and/or into said post convertor.

2. The synthesis gas plant according to claim 1, wherein said first catalyst bed comprises a structured catalyst comprising a macroscopic structure of electrically conductive material, said macroscopic structure supporting a ceramic coating, wherein said ceramic coating supports a catalytically active material.

3. The synthesis gas plant according to claim 2, wherein the first catalyst bed comprises an array of macroscopic structures.

4. The synthesis gas plant according to claim 2, wherein said macroscopic structure(s) has/have a plurality of parallel channels, a plurality of non-parallel channels and/or a plurality of labyrinthic channels.

5. The synthesis gas plant according to claim 2, wherein said macroscopic structure(s) is/are extruded and sintered structure(s).

6. The synthesis gas plant according to claim 1, wherein the resistivity of the electrically conductive material is between $10^{-5}\,\Omega\cdot m$ and $10^{-7}\,\Omega\cdot m$.

7. The synthesis gas plant according to claim 2, wherein the material of the macroscopic structure is chosen as a material arranged to generate a heat flux of 500 to 50000 $W/m^2$ by resistance heating of the material.

8. The synthesis gas plant according to claim 2, wherein the connection between the macroscopic structure(s) and said at least two conductors is a mechanical connection, a welded connection, a brazed connection or a combination thereof.

9. The synthesis gas plant according to claim 1, wherein said pressure shell further comprises one or more inlets close to or in combination with at least one fitting in order to allow a cooling gas to flow over, around, close to, or inside at least one conductor within said pressure shell.

10. The synthesis gas plant according to claim 1, wherein the electrically conductive material comprises a resistor embedded in the catalytically active material of the first catalyst bed.

11. The synthesis gas plant according to claim 10, wherein said embedded resistor supports a ceramic coating, wherein said ceramic coating supports said catalytically active material.

12. The synthesis gas plant according to claim 1, wherein the reforming reactor system further comprises a bed of a third catalyst material upstream said first catalyst bed within said pressure shell.

13. The synthesis gas plant according to claim 1, further comprising a gas separation system downstream the post converter, said gas separation system comprising one or more of the following units: flash separation, a $CO_2$ wash unit, a temperature swing adsorption unit, a pressure swing adsorption unit, a membrane, and/or a cryogenic separation unit.

14. The synthesis gas plant according to claim 1, further comprising a first heating unit for heating the feed gas upstream said reforming reactor system.

15. The synthesis gas plant according to claim 1, wherein said first heating unit is a fired heater, a heat exchange unit or an electric preheating unit.

16. The synthesis gas plant according to claim 1, further comprising a second heating unit arranged to heat a $CO_2$ rich gas stream to said heated $CO_2$ rich gas stream by heat exchange within the second heating unit.

17. The synthesis gas plant according to claim 1, further comprising means for heating a $CO_2$ rich gas stream to said heated $CO_2$ rich gas stream by heat exchange with at least part of the second synthesis gas exiting the post converter and/or by heat exchange with superheated steam upstream the post converter.

18. The synthesis gas plant according to claim 1, wherein said post converter is an adiabatic post converter.

19. The synthesis gas plant according to claim 1, said synthesis gas plant further comprising a gas purification unit and/or a prereforming unit upstream said reforming reactor system.

20. The synthesis gas plant according to claim 1, wherein said reforming reactor system further comprises a control system arranged to control the electrical power supply to ensure that the temperature of the first synthesis gas stream exiting the pressure shell of the reforming reactor system lies in a predetermined range and/or to ensure that the conversion of hydrocarbons in the feed gas lies in a predetermined range and/or to ensure the dry mole concentration of methane lies in a predetermined range and/or to ensure the approach to equilibrium of the steam reforming reaction lies in a predetermined range.

21. A process for producing synthesis gas, said process comprising the steps of:
a) in a reforming reactor system, comprising a first catalyst active bed comprising an electrically conductive material and a catalytically active material, said catalytically active material being arranged for catalyzing steam reforming of a feed gas comprising hydrocarbons to produce a first synthesis gas stream, said reforming reactor system further comprising a pressure shell housing a first catalyst bed, a heat insulation layer between said first catalyst bed and said pressure shell, and at least two conductors electrically connected to said electrically conductive material and to an electrical power supply placed outside said pressure shell, wherein said pressure shell has a design pressure of between 15 and 200 bar, receiving said feed gas comprising hydrocarbons, passing an electrical current through said electrically conductive material thereby heating at least part of said first catalyst bed to a temperature of at least 500° C. by, letting said feed gas comprising hydrocarbons react over the first catalyst bed and outletting a first synthesis gas stream;
b) in a post converter downstream the reforming reactor system, said post converter housing a second catalyst active for catalyzing steam methane reforming, methanation and reverse water gas shift reactions, receiving at least part of said first synthesis gas stream, carrying out steam methane reforming, methanation and reverse water gas shift reactions and outletting a second synthesis gas stream; and
c) adding a heated $CO_2$ rich gas stream to the at least part of the first synthesis gas stream upstream the post converter and/or into the post converter.

22. The process according to claim 21, further comprising the step of heating said feed gas comprising hydrocarbons in a first heating unit upstream the reforming reactor system.

23. The process according to claim 22, wherein said first heating unit is a fired heater, a heat exchange unit or an electric preheating unit.

24. The process according to claim 21, further comprising the step of heating a $CO_2$ rich gas stream to said heated $CO_2$ rich gas stream by heat exchange within said first heating unit.

25. The process according to claim 21, further comprising the step of heating a $CO_2$ rich gas stream to said heated $CO_2$ rich gas stream, by heat exchange with superheated steam upstream the post converter.

26. The process according to claim 21, further comprising the step of heating a $CO_2$ rich gas stream to said heated $CO_2$ rich gas stream by heat exchange with at least part of the second synthesis gas exiting the post converter.

27. The process according to claim 21, wherein said post converter is an adiabatic post converter.

28. The process according to claim 21, further comprising a step of separation of $CO_2$ from the second synthesis gas.

29. The process according to claim 21, wherein the second catalyst is a steam reforming catalyst.

* * * * *